United States Patent [19]

Lynnworth

[11] 4,004,461

[45] Jan. 25, 1977

[54] ULTRASONIC MEASURING SYSTEM WITH ISOLATION MEANS

[75] Inventor: Lawrence C. Lynnworth, Waltham, Mass.

[73] Assignee: Panametrics, Inc., Waltham, Mass.

[22] Filed: Nov. 7, 1975

[21] Appl. No.: 629,870

[52] U.S. Cl. .............................................. 73/194 A
[51] Int. Cl.² .......................................... G01F 1/66
[58] Field of Search .............. 73/194 A, 61 R, 67.6

[56] References Cited

UNITED STATES PATENTS

3,204,458  9/1965  Gillen ............................... 73/194 A
3,357,243  12/1967  Woodcock ...................... 73/194 A Primary Examiner—James J. Gill
Attorney, Agent, or Firm—Kenway & Jenney

[57] ABSTRACT

A device for performing ultrasonic measurements on liquid flowing within a conduit having walls of relatively high acoustic impedance material. The conduit is split into two separate segments with the emitting transducer in one segment and a receiving transducer in the other segment. The space between segments is filled with a sealant material having relatively low acoustic impedance characteristics to provide an acoustic mismatch and hence attenuation to ultrasonic energy traveling through the conduit wall from the transmitter to the receiver. Because of the separation between segments ready access is provided to the internal walls of the conduit, allowing transducer configurations to be employed, which configurations require machining or assembly to be performed on the interior walls.

16 Claims, 16 Drawing Figures

ULTRASONIC MEASURING SYSTEM WITH ISOLATION MEANS

FIELD OF THE INVENTION

This invention relates in general to a method and apparatus for ultrasonic measurements of liquid flow within a conduit and more particularly to such a system having improved signal to noise characteristics.

BACKGROUND OF THE INVENTION

Utilization of ultrasonic measurements for the determination of various properties of a flowing material within an enclosed conduit is now a well developed art. Numerous publications and patents have described a variety of techniques for mounting ultrasonic transducers from the external or internal surfaces of the conduits and transmitting a generated beam through the fluid, receiving it at a second transducer, and measuring variations in transit time, or its reciprocal which is proportional to sound speed $c$, or attenuation of the signal. These ultrasonic parameters indicate the flow characteristics, quality, temperature, or other characteristics of the fluid. The ultrasonic flow-sensing signal is typically emitted repeatedly or alternately from one of a pair of transducers mounted at opposite ends of a tilted diameter or diagonal across the conduit, with the direction of tilt being in the direction of flow of a material. The time delay difference (upstream time minus downstream time) between the generation of the emitted signals and their reception is a measure of the velocity of the flow. Other characteristics of the material may be determined by measurement of the attenuation of the received signal. In one embodiment a crossed pair of tilted paths are used with an emitting transducer and receiving transducer located at the ends of each of the crossed pairs. Techniques for measuring both the transit times and the attenuations are described in a number of patents and articles. These include particularly:

| Patent Number | Inventor(s) | Issue Date |
| --- | --- | --- |
| U.S. Pat. No. 2,746,291 | R. C. Swengel | May 22, 1956 |
| U.S. Pat. No. 2,755,662 | R. C. Swengel | July 24, 1956 |
| U.S. Pat. No. 2,874,568 | L. A. Petermann | February 24, 1959 |
| U.S. Pat. No. 2,959,054 | W. Welkowitz | November 8, 1960 |
| U.S. Pat. No. 3,050,997 | D. B. Lake | August 28, 1962 |
| U.S. Pat. No. 3,553,636 | J. D. Baird | January 5, 1971 |
| U.S. Pat. No. 3,564,912 | J. T. Malone et al | February 23, 1971 |
| U.S. Pat. No. 3,636,754 | L. C. Lynnworth et al | January 25, 1972 |
| U.S. Pat. No. 3,575,050 | L. C. Lynnworth | April 13, 1971 |
| U.S. Pat. No. 3,731,532 | A. Courty | May 8, 1973 |
| U.S. Pat. No. 3,788,140 | Q. C. Turtle | January 29, 1974 |
| U.S. Pat. No. 3,906,791 | L. C. Lynnworth | September 23, 1975 |

In order to produce an ultrasonic beam emitted at an angle to a diameter across the conduit, a variety of specific techniques have been employed. These include the use of externally mounted wedges for generating an angular refracted beam, as well as a variety of internal machining techniques. One limitation on the accuracy of such ultrasonic measurements arises from what is referred to as "short circuit noise". The short circuit noise originates at the emitting transducer and is coherent at the receiving transducer with the ultrasonic wave transmitted through the fluid. Short circuit noise is ultrasonic energy which travels directly through the walls of the conduit from the emitting transducer to the receiving transducer. It is apparent that such energy is not attenuated or otherwise affected by the fluid characteristics within the conduit and hence presents a noise background signal. The effect of this noise is particularly pronounced where ultrasonic waves transmitted through the fluid material pass through a solid-fluid interface, thereby undergoing attenuation due to the acoustic mismatch between these materials. Since the noise signal undergoes no such mismatch its relative amplitude appears to be enhanced. Interference of this noise signal with the ultrasonic energy transmitted through the fluid leads to errors in measuring the arrival time and the amplitude of the received wave. Where the characteristic being measured is the flow velocity, the maximum error in velocity may be shown to be approximately proportional to the reciprocal of the signal to noise ratio and may be as large as 7% when the signal to noise ratio equals ten for typical flow velocities. This type of calculation can be understood with the aid of a vector diagram as discussed in the article "Clamp-On Ultrasonic Flowmeters: Limitations and Remedies", published in Instrumentation Technology (9), 37–44 (September, 1975).

One technique which has been employed in the past to minimize this short circuit noise problem is to mount at least one of the transducers within an acoustically isolating material in the conduit wall. In such an arrangement a cylindrical transducer is mounted within a cylindrical opening in the wall which is larger in diameter than the transducer and the intervening space is filled with an acoustically damping material. Such a configuration provides difficulties, not only in initially mounting the transducer, but also in maintaining precise alignment of the direction of the beam emitted from the transducer, due to phenomena such as creep of the acoustical damping material.

A second, unrelated, problem encountered in the preparation of ultrasonic flow cells for the measurement of velocity and other characteristics of flowing material, arises from the difficulty, in many instances, of providing access to the interior walls of the conduit. When there is no such access, the choice of techniques for generating the appropriate directional ultrasonic beams is substantially limited to configurations which may be machined or installed from outside the conduit, yet such configurations are not entirely satisfactory for all applications.

It is, therefore a primary object of the present invention to minimize the short circuit noise contribution in ultrasonic flow measurements, thereby enhancing the signal to noise ratio.

It is another object of the present invention to provide an ultrasonic measuring apparatus for materials flowing within a conduit enabling easy access to the interior of the conduit for machining or other mounting or directional-beam-controlling techniques.

SUMMARY OF THE INVENTION

Broadly speaking, in the present invention, the transmitting and receiving ultrasonic transducers are mounted in spaced apart relation on the conduit wall to provide for the transmission of a beam of ultrasonic energy through the fluid flowing within that conduit. The conduit wall is formed with an opening dividing the conduit into two segments, with the separation between the segments occurring between the spaced apart positions of the transducers. The separation is filled with a sealant material which has lower acoustic impedance characteristics than the relatively high impedance characteristic of the conduit wall, and accordingly presents an acoustic mismatch to ultrasonic energy traveling through the conduit wall from one transducer to the other. The result of this mismatch is a significant attenuation of the "acoustic short circuit" noise signal with a concomitant improvement in the signal to noise ratio. In those instances where the two segments of the conduit are formed as separate spool pieces with external flanges, the external flanges are bolted together with care being taken to prevent a high impedance acoustic path through the attaching bolts. This can be accomplished by utilization of low acoustic impedance spacers or washers between the bolt heads and the flanges. Not only can the signal to noise ratio be considerably enhanced by this method, but also, since the conduit is separated in the region immediately adjacent to the transducers, access to the internal walls of the conduit is provided for utilization of mounting techniques from the inside, as well as the employment of appropriate windows or screens on the interior wall.

DESCRIPTION OF PREFERRED EMBODIMENTS

Figures 1, 2:
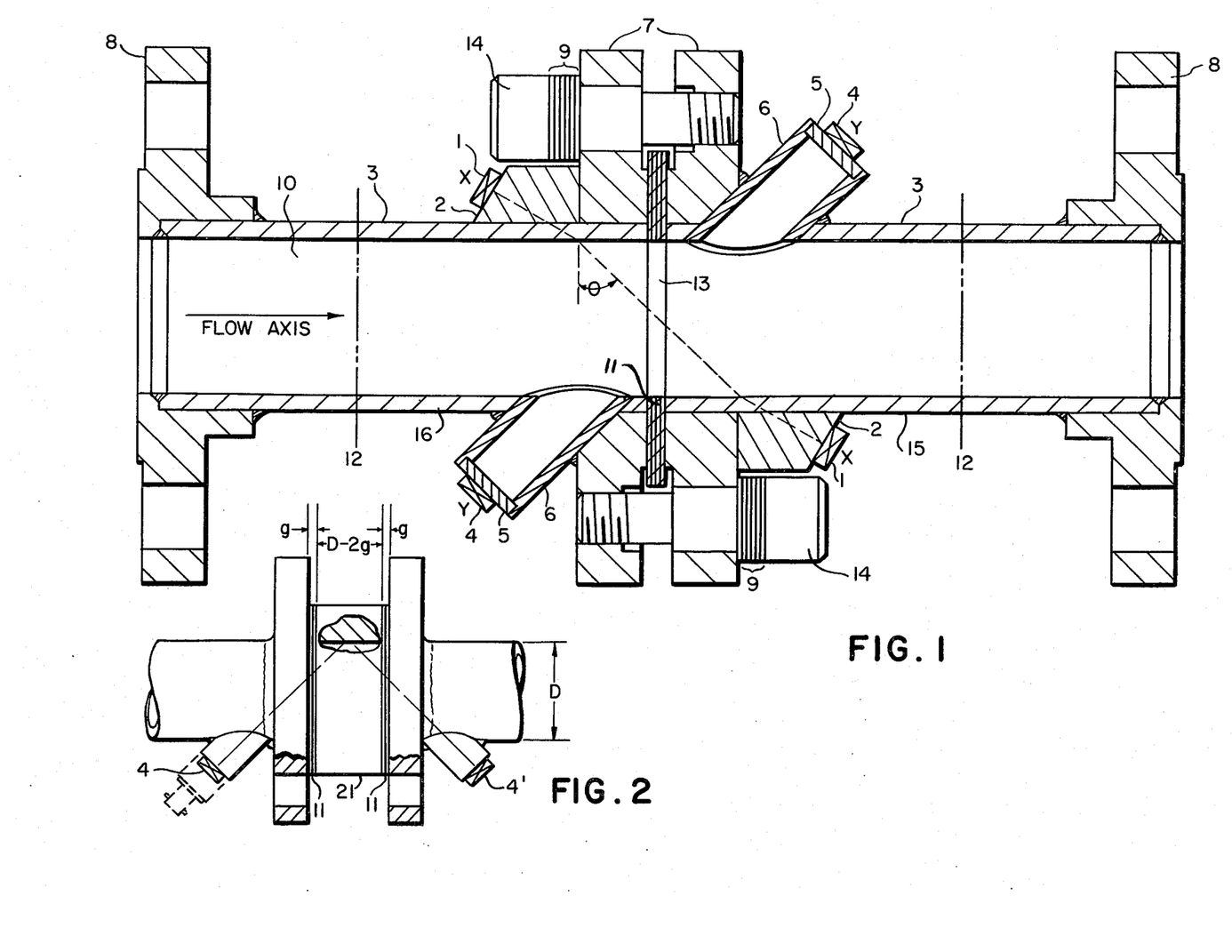
FIG. 1 is an illustration in cross sectional view of an ultrasonic transducer system constructed in accordance with the principles of this invention.
FIG. 2 is an illustration in partial cross sectional view of a second embodiment of an ultrasonic transducer apparatus constructed in accordance with the principles of this invention.

With reference now to FIG. 1, a cross sectional view of an ultrasonic interrogation apparatus is shown. The conduit 3 for containing the fluid 10 flowing along the indicated flow axis is shown generally as a right cylinder with the walls formed of a suitable material, such as stainless steel, which exhibits a relatively high acoustic impedance, in the order of $50 \times 10^6 kg/m^2 S$. In this particular instance, the conduit 3 is formed as part of a flowmaster cell for insertion into the pipeline. The flowmeter cell consists of two separate spool pieces 15 and 16, each having external flanges 8 for mounting to the pipeline with each spool piece separated from the other by a gap 13. The spool pieces are also provided with flanges 7 fastened together by means of bolts 14. The gap 13 between the two spool pieces or segments 15 and 16 is sealed with a series of gaskets 11 interposed between the flanges 7. These gaskets 11 are formed of a low acoustic impedance material, such as composite polytetrafluoroethylene and asbestos gaskets to provide not only a fluid seal for the conduit, but also an acoustic mismatch of at least an order of magnitude for any acoustic energy transmitted through the conduit walls 3 from one segment to the other. A suitable gasket material has been found to be gaskets manufactured by Flexitallic Gasket Company, Inc., Camden, New Jersey under the trademark Flexitallic and a gasket manufactured by Johns Manville, Denver, Colorado under the designation JM-78. Typical preferred gasket materials have impedances on the order of $2 \times 10^6 kg/m^2 S$.

The first pair of transducers 1 are mounted on wedges 2 constructed of a metal material, such as stainless steel, with the transducers 1 being mounted at an appropriate angle to the conduit wall 3 so that the ultrasonic beam refracted at the interface between the wall 3 and the fluid 10 is transmitted at an angle $\theta$ across the fluid. The transducers 1 may be any suitable ultrasonic transducers such as piezoelectric crystals. After refraction at the opposite fluid-wall interface, the beam is transmitted through wedge 2 on the opposite side of the conduit and is sensed at transducer 1. Typical signal transmission losses at each of the fluid pipe interfaces amount to about 10 dB for common liquids, and about 40 dB for common gases. Since the transmitted signal undergoes two such attenuations the total signal is severely attenuated. On the other hand acoustic energy transmitted through the walls of the conduit would pass through an uninterrupted path, free from acoustic mismatches, were it not for the gap 13 with the sealing gaskets 11. However, because of the acoustic mismatches introduced by the gaskets 11, the "short circuit" noise is considerably reduced. The transducers 1 along the path can therefore provide a reasonably high signal to noise ratio while interrogating the fluid 10 for measurement of velocity along the flow axis. There are, however, limitations encountered in utilization of this XX path in that the refraction angle $\theta$ changes with wide variations in the sound velocity in the fluid and compensation must then be introduced in order to obtain the correct relationship between transit time differences and sums and fluid velocity. Accordingly, in some instances, it is desirable to direct the ultrasonic beam along an angular path through the flow material 10, without involving a refraction of the beam. Path YY, in FIG. 1, provides such an example. In path YY the transducers 4 are coupled to metal windows 5 which are supported upon short pipe sections 6 with these pipe sections being welded into the conduit walls 3. The beam is therefrom directed in a substantially straight line path through the fluid 10.

While the outboard flanges 8 are shown as a method of including the entire flowmeter cell in a pipeline, these flanges are not essential. The flowmeter could, for example, be welded directly into a pipeline at the points 12. The gaskets 11 and the gasket 9 may be formed of multiple layers of the gasket material as described or alternatively may be formed of a series of annular disks having dissimilar acoustic impedance, for example, a disk of asbestos butted with a disk of steel and followed again by a disk of asbestos.

In FIG. 2 a configuration of flowmeter is shown in which the transducers 4 are both positioned on the same side of the conduit wall 3 with the beam transmitted through the fluid material 10 at an angle of 45°, so that it is reflected from the opposite conduit wall 3 back into the receiving transducer 4'. In this instance the acoustic isolation of the short circuit noise is provided by dividing the cell into three segments, the central segment 21 being isolated from the conduit walls 3 by means of a pair of gaskets 11 situated on both the upstream and downstream ends of the central segment 21. The length of the central segment 21 is approximately equal to D-2g, where D equals the inside diameter of the conduit, and g equals the gasket thickness. In order to ensure that the transducer axis is in proper alignment, shims (not shown) may be interposed between the gasket layers 11.

Figure 3:
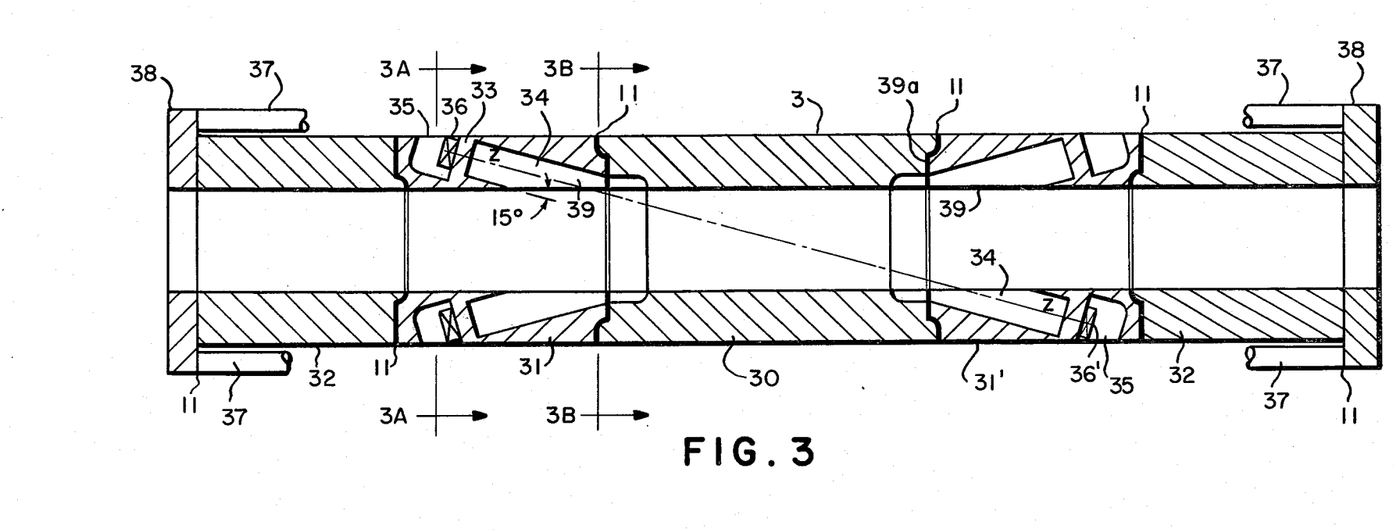
FIGS. 3, 3A and 3B illustrations in cross sectional view of still another embodiment of an ultrasonic transducer apparatus constructed in accordance with the principles of this invention.
Figure 3A:
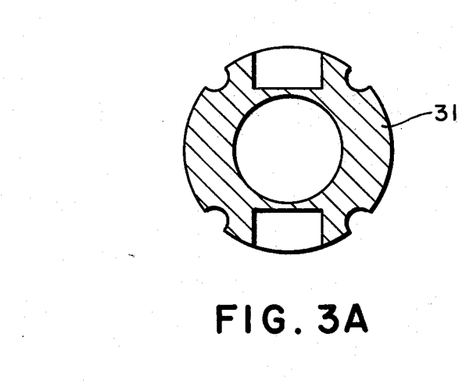
Figure 3B:
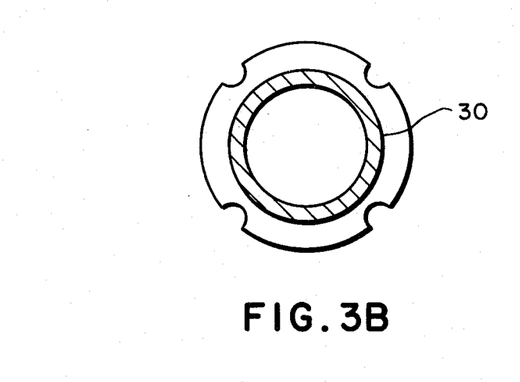

In FIG. 3 there is still another embodiment of the flowmeter cell illustrated. In this embodiment, ports 34 for the transducers 36 are machined in the interior surface of the conduit wall 3. As above mentioned, the segmenting of the conduit renders such a construction feasible in that it allows access to the interior surfaces of the conduit. In the flowmeter cell shown in FIG. 3, the central member 30 of the flow cell separates the segment 31 including the transmitter/transducer 36 from the segment 31' containing the receiver/transducer 36'. The transducer pairs 36 and 36' transmit ultrasonic beams through the fluid 10 along the path ZZ. Each of the transmitter and receiver segments 31 and 31' contain flat bottom drilled holes 34, which are drilled in the interior wall prior to assembly of the flowmeter cell. Aligned with the axes of these two holes 34 are transducer cavities 35, which were milled from the outside of the conduit 3. Gaskets 11 are squeezed between the adjacent sections 31 and 30 of conduit 3 to form a seal and similarly the gaskets located between end segments 32 and the transducer segments 31 are pressed between flanges 38 and segments 32. The bolt holes in the flanges 38 may be tapped so that threaded tie rods 37 may be used as turn-buckles to tighten up the entire assembly.

In order to minimize turbulence at the ports 34, they may be fitted with thin windows, usually consisting of a thin walled stainless steel sleeve 39 mounted coaxially with the flow axis and positioned by an annular tab 39a. The sleeve 39 may be perforated or screened to maximize the signal transmission, or may be made sufficiently thin compared to the wavelength of the ultrasonic transmission so that the attenuation is minimal. In the assembly of FIG. 3 the propagation of ultrasonic waves is measured over a path which is inclined at about 75°. To drill a port at this angle from the outside of a thick walled pipe conduit presents extreme practical problems. But, because of the segmenting of the conduit, part of the machining may be done from the interior. Thin window sections 33 between the transducer 36 and the ports 34 formed by machining operations from both the interior and exterior of the conduit provide for efficient transmission of ultrasonic waves, and since the window is left intact, there is no need to provide for sealing against leaks at said window.

Figure 4:
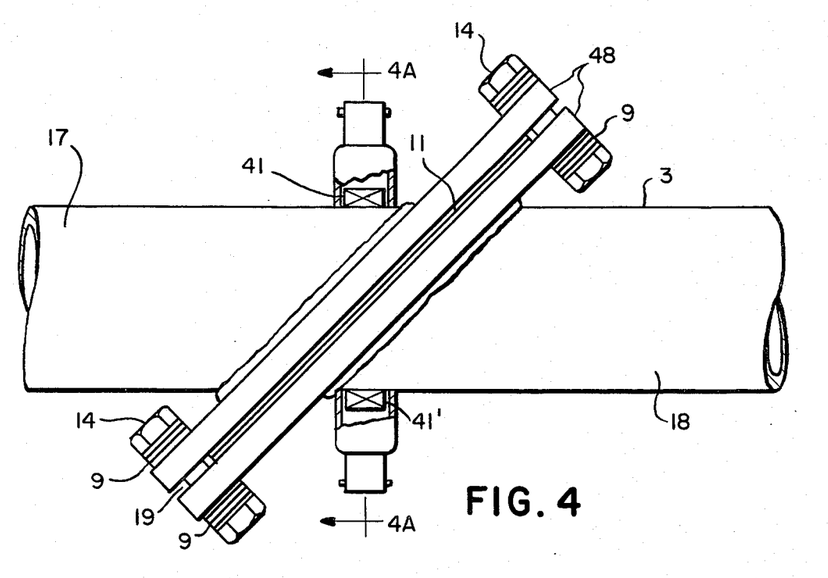
FIG. 4 is a perspective view of yet another embodiment of a transducer apparatus constructed in accordance with the principles of this invention.
Figure 4A:
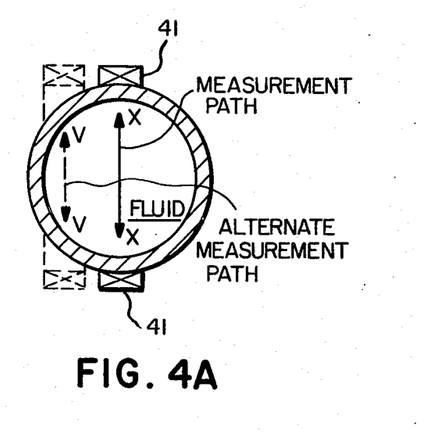
FIG. 4a is a cross sectional illustration taken along the line A—A of FIG. 4.
Figure 6:
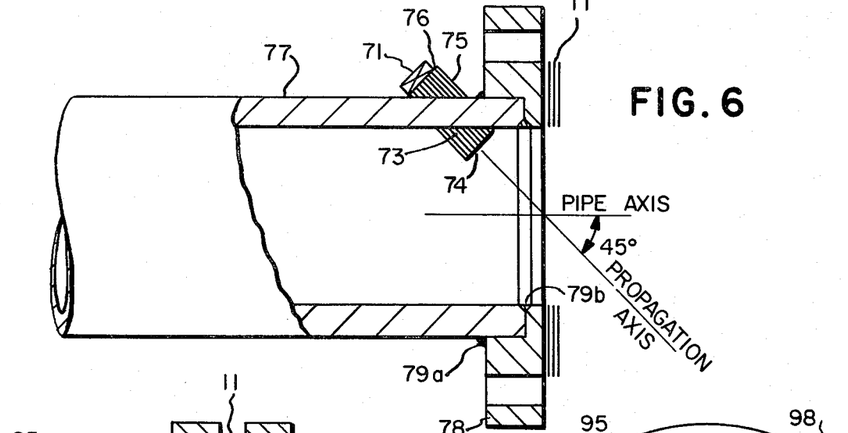
FIG. 6 is an ullustration in perspective view of a transducer apparatus constructed in accordance with the principles of this invention.

Another embodiment of the invention is illustrated in FIGS. 4 and 4a. In this configuration the ultrasonic transmission path XX is orthogonal to the principal flow axis in the conduit 3 and there is an oblique separation 19 between segments 17 and 18 of the conduit. This separation 19 is surrounded by flanges 48 to enclose the low impedance gasketing material 11, serving, as above described, both as a sealant and has an ultrasonic mismatch to prevent short circuit noise from one of the transducers 41 from reaching the other transducer 41'. The fastening elements for compressing the gaskets 11, again consist of bolts 14, which are themselves acoustically isolated by a series of gaskets 9 also formed of low impedance materials. In FIG. 4a a cross sectional view taken along the line A—A of FIG. 4 is shown. As there illustrated the conventional measurement path XX is across a diameter of the cylindrical conduit 3. An alternate measurement path is shown as VV. Path VV is useful in measuring the amount of swirl in the flow. If not for the isolating gaskets, the measurements along VV would be interfered with by a strong short circuit component of noise. Furthermore, by forming the cell in separate sections with access to the interior, it is possible to install wedges or reflectors internally so that measurements along a path such as VV may be selected, independent of refraction-limited angles, yet with the use of non-wetted, clamped-on transducers. In this way, one or more paths such as VV may be utilized, at selected distances from the pipe axis. It will be understood that such off-axis VV paths may similarly be introduced as tilted-chord paths in cell configurations such as FIG. 1. One half of a cell containing an internal wedge is shown in FIG. 6. Here, the internal wedge 73 is aligned with the external wedge 75 so that faces 74 and 76 are parallel. Wedges 73 and 75 are made of the same material, which may also be the same as the material of the pipe.

Figure 7:
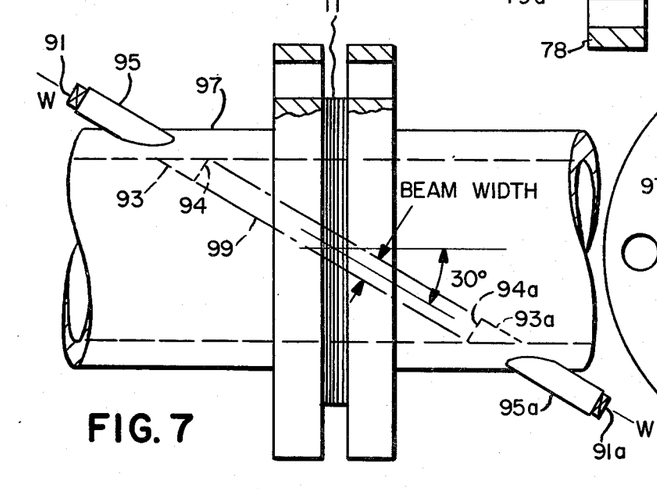
FIGS. 7 and 7a are illustrations in perspective and cross sectional view of still another apparatus utilizing the principles of this invention.
Figure 7A:
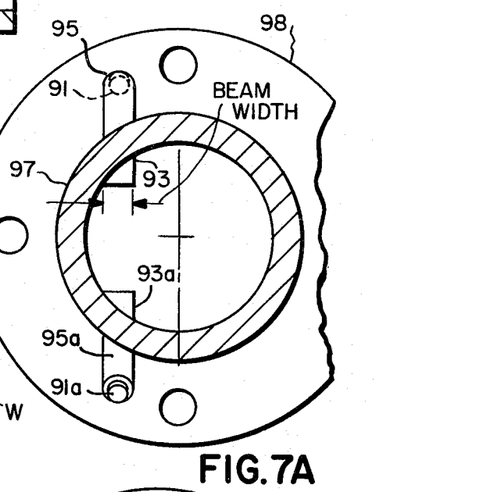

Internal wedges or reflectors may also be used to obtain off-axis paths such as WW in FIG. 7. The need for a multiplicity of such off-axis paths is described in the cited U.S. Pat. No. 3,564,912. The present invention allows paths such as defined by the quadrature methods of Gauss, Chebycheff or Lobatto, and listed in the cited patent, to be used either with clamp-on transducers, or with wetted transducers, in either case simplying the fabrication, and/or improving the signal/noise ratio.

Figure 8:
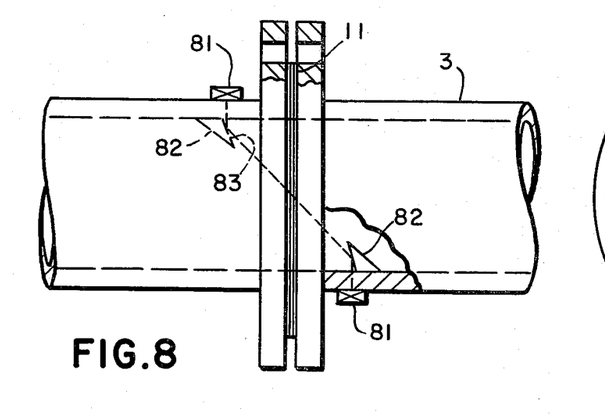
FIGS. 8 and 8a are illustrated in perspective and cross sectional view of still another apparatus in accordance with the invention.
Figure 8A:
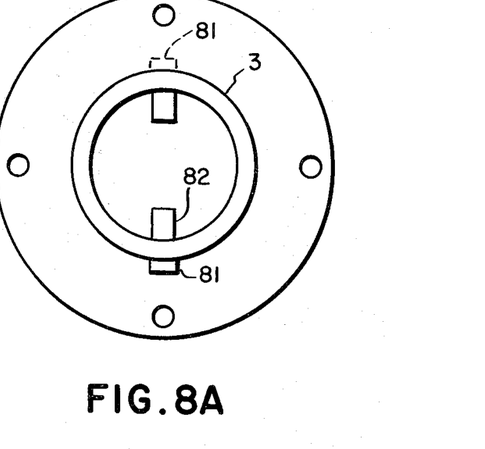

FIG. 8 shows the use and location of reflectors 82 mounted on the inside of the wall 3. One member of each reflector pair is mounted in each half of the measurement cell. The transducers 81 are shown mounted externally. The emitter radiates a directional beam radially inward, which strikes the inclined face 83 of reflector 82, and then propagates at an angle such as 45°, to the second reflector, and then to the receiver transducer. For this particular numerical case the inclined face 83 is inclined at an angle of 22.5° to the radially-incident beam. Because the transducers 81 are mounted so as to transmit and sense ultrasonic waves which propagate radially in the pipe wall 3, they are relatively insensitive to residual short circuit noise which arrives after circumferential (i.e., nonradial) propagation. The reflectors 82 may include passageways for flushing to avoid buildup of sediment, or they may be hinged and spring-loaded, or removably-mounted, to facilitate cleaning or replacement. The 45° path shown in FIG. 8 is along a tilted diameter. It will be understood that off-axis tilted chords are also usable, including the multiplicity of tilted chords which may be desirable in certain quadrature methods for area-averaging. The reflectors, then, like the wedges of FIGS. 6 and 7, assure directional propagation independent of sound speed fluctuations, thereby contributing to high signal/noise and reliable, controlled beaming of the waves.

Figure 5:
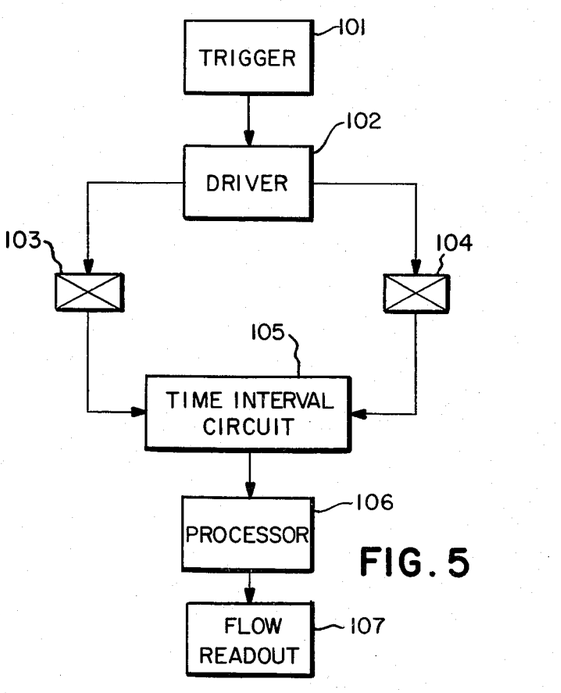
FIG. 5 is an illustration in block diagrammatic form of circuitry useful in conjunction with the flowmeter of this invention.

In FIG. 5 there is illustrated in block diagrammatic form circuitry for use with the flow cells described previously. A trigger unit 101 provides at either programmed times or in response to manual initiation, a triggering signal to drive unit 102, which provides actuating signals to transducers 103 and 104 which may be positioned, for example in the arrangement shown in the embodiment of FIG. 1. Transducers 103 and 104, upon excitation from the drive unit 102, emit pulses or beams of ultrasonic waves. The ultrasonic beam from the transducer 104 is sensed by transducer 103 and vice versa. The outputs from the transducers 103 and 104 which are signals responsive to received ultrasonic beams may be supplied to time interval circuit 105 and the outputs from this circuit, representing the travel times or phases in the received signals, is provided through processor 106 to flow readout indicator 107. The processor 106 serves the function of computing from the outputs of the time interval circuit, suitable combinations of terms to properly operate the flow readout indicator 107. Again, the difference in transit times between the upstream traveling beam and the downstream traveling beam provides an indication of the flow velocity of the fluid within flow conduit 1. The upstream and downstream beams can be separated either by initiating the beams at different time so that the measurements are essentially made in rapid sequence or, preferably, by simultaneous measurements. The latter may be accomplished by any of several known techniques. One technique using pseudo random noise coding is described in a paper delivered at the IEEE Ultrasonic Symposium in Boston on October 4–7, 1972 designated paper L6 entitled Ultrasonic Mass Flowmeter, 1972 Ultrasonics Symposium Proceedings, (Pages 87–90) Catalog No. 72 CHO 708-8SU.

Figure 9:
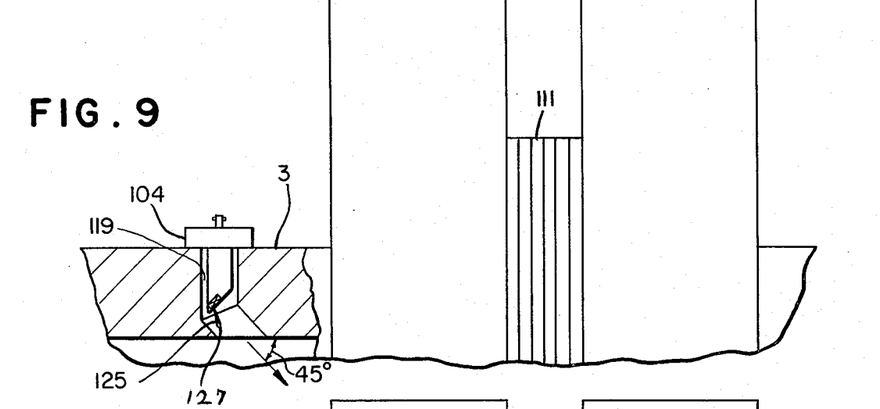
FIGS. 9, 10 and 11 are sectional views illustrating alternative embodiments of the invention.
Figure 10:
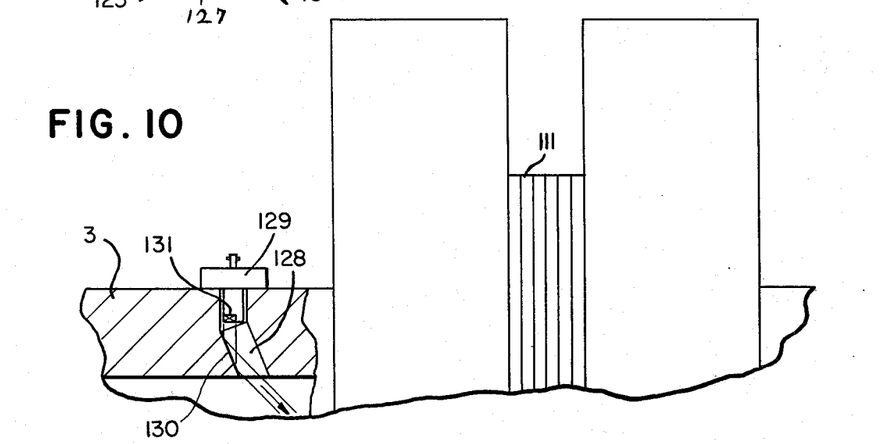
Figure 11:
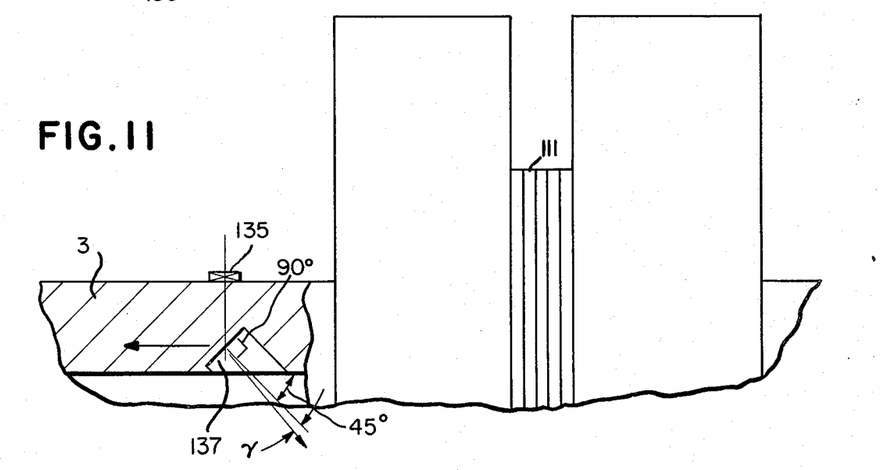

In FIGS. 9, 10 and 11 there are illustrated three additional examples of how the use of separate sections for transmitter and receiver transducers permits certain preferred machining operations to be performed. These machining operations in turn enable the transducers or the transducer holders to be mounted in a radial (nonoblique) orientation, and yet provide an oblique interrogation path at an angle which is totally or substantially immune to sound speed changes in the fluid.

The transmitter and receiver transducers are located on conduit 3 symmetrically on either side of the gasketed joint 111. In FIG. 9 the wall 3 is penetrated by intersecting holes 119 and 125 machined radially from the outside, and obliquely, for example, at 45°, from the inside. Transducer holder 104 contains a transducer 127 at its small end, mounted within the holder at 45° to the holder axis. Thus, the emerging beam is launched without refraction along the inclined path at an angle of 45° to the pipe axis.

In FIG. 10 both holder 129 and transducer 131 axes are parallel. These axes are in the radial direction. The oblique hole 128 is machined with its axis typically at 22.5° to the radial direction. Therefore, a radially-incident beam from the transducer is reflected along an inclined path at 45° to the pipe axis. The reflecting face 130 may be flat.

The alternatives detailed in FIGS. 9 and 10 provide paths at angles which are independent of sound speed in the fluid within the pipe.

In FIG. 11 a nonpenetrating, flat-bottom, oblique (e.g. 45°) hole 137 is machined from the inside of the pipe 3. This hole 137 has a diameter somewhat larger than the transducer 135 diameter. The transducer 135 is externally clamped on or otherwise mounted with its axis in the radial direction. The beam emitted by this transducer 135, upon striking the flat bottom of the machined hole 137, is partly transmitted generally in the direction of the hole's axis. The centerline of the beam refracted into the fluid propagates at a small angle $\gamma$ to the hole axis, where, from Snell's Law, $\sin \gamma = (c_2/c_1) \sin \theta_1$, $(c_2/c_1)$ being the ratio of sound speeds in the fluid and pipe, respectively. For metal pipes containing water or other common liquids, $c_2/c_1$ may be on the order of 0.2 to 0.3. If the fluid is air or other common gases, $c_2/c_1$ may reduce to about 0.05 to 0.1. Now, if $\theta_1 = 45°$, then $\gamma = 8°$ to 12° for the liquid examples, and 2° to 4° for the gas examples. These values for $\gamma$, while small, are somewhat sensitive to $c_2$. However, by equating $\gamma$ with the 3 dB beam spread half-angle $\theta_b = \lambda/a$, $\lambda$ being the wavelength in the fluid, $c_2/f$, with $f$ being the frequency, and $a$ being the transducer radius, a sufficiently intense portion of the beam will ordinarily be intercepted at the receiver, over a path between aligned holes, which path is essentially inclined at the hole angle (say 45°), essentially independent of $c_2$ fluctuations, for pipes of relatively large diameter. Further, the portion of the radially-incident beam which is not transmitted into the fluid, is reflected away from the receiver, promoting a high signal/noise ratio.

While specific materials and specific geometric configurations have been illustrated, it will be understood that the invention claimed should not be limited to these.

What is claimed is:

1. An apparatus for measuring the ultrasonic response characteristics of a fluid flowing within a conduit having walls formed of a high acoustic impedance material comprising, a first transducer mounted on said conduit wall in a first position for transmitting a beam of ultrasonic energy through a portion of said conduit wall into said fluid;

a second transducer mounted on said conduit wall at a second position spaced apart from said first position, said second transducer producing output signals in response to received ultrasonic energy;

an opening in said conduit wall between said first and second positions separating said conduit into first and second separate segments, said first transducer position being located within said first segment and said second transducer position being located within said second segment; and a sealant material confined to the opening between the first and second segments of said conduit to seal said first and second segments together, said sealant material having an acoustic impedance low in comparison to the acoustic impedance of said conduit walls, thereby forming an acoustic mismatch to ultrasonic energy transmitted from said first segment to said second segment through the walls of said conduit.

2. Apparatus in accordance with claim 1 wherein the first and second segments are joined together with external flanges, the fastening members joining said external flanges having material of low acoustic impedance inserted between said fastening members and said flanges to provide between said first and second segments only acoustic paths which include acoustic mismatches.

3. Apparatus in accordance with claim 1 wherein said first and second transducers are disposed at opposite ends of a tilted diameter path, the direction of tilt of said path being in the direction of flow of said fluid material within said conduit.

4. Apparatus in accordance with claim 3 and having third and fourth transducers disposed at opposite ends of a second tilted diameter path, said second tilted diameter path being tilted in a direction of flow of said fluid material and wherein said third transducer is mounted on said conduit wall within said first segment and said fourth transducer is mounted on said conduit wall within said second segment, one of said third and fourth transducers being a transmitting element for transmitting a beam of ultrasonic energy across said flowing fluid and the other of said third and fourth transducers being a receiving transducer for receiving said transmitted beam and providing an output signal in response thereto.

5. Apparatus in accordance with claim 1 wherein said first and second transducers are disposed on said conduit wall on the same side of said conduit and wherein said first transducer emits a beam of ultrasonic energy across said fluid to reflect from the opposite wall of said conduit, said reflected beam being directed toward said second transducer.

6. A method of measuring the ultrasonic response characteristics of a fluid material flowing within a closed conduit having walls formed of a resatively high acoustic impedance material comprising the steps of;
separating said conduit into two segments and sealing said separated segments together with a sealant material characterized by a substantially low acoustic impedance;
transmitting a beam of ultrasonic energy through said conduit wall into said flowing material from a position on the wall of said conduit within said first segment, and
measuring ultrasonic energy transmitted through said flowing material at a position on the wall of said conduit within said second segment.

7. Apparatus according to claim 1 having a first wedge, mounted on the external surface of said wall, said wedge having one surface orthogonal to the axis of said beam of acoustic energy transmitted into said fluid, said first transducer being mounted on said one surface, and
a second wedge of material exhibiting the same acoustic velocity characteristic as said first wedge, said second wedge being mounted on the internal wall of said conduit, and having a surface parallel with and in general alignment with one surface on said first wedge.

8. Apparatus in accordance with claim 7 having a third wedge identical to said first wedge supporting said second transducer on an external wall of said conduit and a fourth wedge identical to said second wedge mounted on an internal wall of said conduit with a surface in parallel alignment with said third wedge transducer supporting surface, said third and fourth wedges being mounted within said second segment.

9. Apparatus in accordance with claim 1 wherein said first and second transducers are located at opposite ends of a path forming a tilted chord within a right circular cylindrical conduit.

10. Apparatus in accordance with claim 1 wherein at least one of said transducers is mounted on an external wall of said conduit directing said ultrasonic beam into said conduit along a path orthogonal with the direction of flow of said material within the conduit, and having a first reflecting member mounted on an internal wall of said conduit with a reflecting surface positioned to intercept at least a portion of said emitted ultrasonic beam and reflect said intercepted portion along a path directed at said second transducer.

11. Apparatus in accordance with claim 10 wherein said second transducer is mounted on an external surface of said conduit wall and having a second reflector mounted on an internal wall of said conduit and positioned to reflect said beam position reflected from said first transducers into said second transducer.

12. Apparatus in accordance with claim 1 having a first cylindrical hole machined into the inner wall of said conduit with its long axis inclined at an oblique angle to the axis of flow of said fluid wherein said first transducer is mounted to transmit said beam of ultrasonic energy along said long axis.

13. Apparatus as in claim 12 wherein a second cylindrical hole is machined from the external wall of said conduit to intersect with said first hole, said second hole having its axis normal to said flow direction.

14. Apparatus in accordance with claim 13 and having an insert mounting extending from outside said conduit into said second hole, said insert mounting having means mounting said first transducer at an angle to direct a beam of ultrasonic energy along the axis of said first hole.

15. Apparatus in accordance with claim 13 wherein said first transducer is mounted to direct a beam of ultrasonic energy along the axis of said second hole, and wherein said first hole including reflecting surface is positioned to intercept the beam transmitted along the axis of said second hole and direct a reflected beam along an axis at an oblique angle to the axis of flow of said fluid.

16. Apparatus in accordance with claim 12 wherein said first hole terminates within said conduit wall at a surface normal to the axis of said hole, and wherein said first transducer is mounted on the external wall of said conduit to direct a beam of ultrasonic energy into said wall toward said terminal surface at such an angle that the beam is refracted at said surface to produce a beam transmitted along said first hole at an oblique angle with respect to the axis of flow of said fluid.

* * * * *